(12) United States Patent
Dermer et al.

(10) Patent No.: US 9,726,688 B2
(45) Date of Patent: Aug. 8, 2017

(54) PITOT TUBE AND HEATING ARRANGEMENT THEREFORE

(71) Applicant: ISRAEL AEROSPACE INDUSTRIES LTD., Lod (IL)

(72) Inventors: Maayan Dermer, Magshimim (IL); Hillel Kain, Pardesiya (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 513 days.

(21) Appl. No.: 14/486,341

(22) Filed: Sep. 15, 2014

(65) Prior Publication Data
US 2015/0075294 A1   Mar. 19, 2015

(30) Foreign Application Priority Data

Sep. 17, 2013 (IL) .......................................... 228493

(51) Int. Cl.
F24H 1/10 (2006.01)
G01P 5/165 (2006.01)
H05B 3/00 (2006.01)

(52) U.S. Cl.
CPC ............ *G01P 5/165* (2013.01); *H05B 3/0038* (2013.01)

(58) Field of Classification Search
None
See application file for complete search history.

(56) References Cited

U.S. PATENT DOCUMENTS

| | | | |
|---|---|---|---|
| 2,229,740 | A | 1/1941 | Helmore |
| 2,681,409 | A | 6/1954 | Dobbins |
| 4,593,533 | A | 6/1986 | Alsenz |
| 5,622,207 | A | 4/1997 | Frank |
| 6,070,475 | A | 6/2000 | Muehlhauser et al. |
| 2010/0116806 | A1 | 5/2010 | Hollingsworth et al. |

FOREIGN PATENT DOCUMENTS

EP     2273275     1/2011

OTHER PUBLICATIONS

European Search Report from European Application No. EP14185234 dated Jan. 20, 2015.

*Primary Examiner* — Thor Campbell
(74) *Attorney, Agent, or Firm* — Dorsey & Whitney LLP

(57) ABSTRACT

A pitot tube is provided having a tube wall and a heating arrangement for generating heat for heating thereby at least a portion of the tube wall to prevent the tube from becoming clogged with ice. The heating arrangement includes a radiation absorbing surface configured for absorbing electromagnetic radiation (EMR) and generating the heat. At least one radiation conveying portion is provided for receiving EMR from an EMR source and conveying it to the radiation absorbing surface.

20 Claims, 7 Drawing Sheets

PITOT TUBE AND HEATING ARRANGEMENT THEREFORE

CROSS-REFERENCE TO RELATED APPLICATIONS

This application claims priority to Israeli Patent Application No. 228493 filed on 17 Sep. 2013, the disclosure of which is incorporated herein, in its entirety, by this reference.

TECHNOLOGICAL FIELD

The present disclosed subject matter relates to a pitot tube in general and in particular to a heating system for pitot tubes.

BACKGROUND

Pitot tube is a pressure measurement instrument utilized for measuring fluid flow velocity in vehicles which do not run on wheels, for example determining the airspeed of an aircraft, water speed of a boat, and to measure liquid. In addition the pitot tube is utilized for measuring air and gas velocities in industrial applications.

The pitot tube includes a tube extending outside the vehicle and having an opening in the direction of the movement of the vehicle, such that fluid flow in the opposite direction enters the tube. Measuring instruments are mounted at the end of the tube configured for measuring the fluid flow velocity by converting the kinetic energy in the fluid flow into potential energy. According to another example the tube can be mounted in an angle with respect to the direction of the movement of the vehicle, for example and aircraft, such that the slide slip angle of the aircraft can be measured.

Pitot tubes on aircraft commonly have heating elements called pitot heat to prevent the tube from becoming clogged with ice, and thus prevent the failure of the pitot tube. The heating element extends through the tube and maintains the temperature thereof at a predetermined temperature.

GENERAL DESCRIPTION

There is provided according to one aspect of the presently disclosed subject matter a pitot tube having a tube wall and a heating arrangement for generating heat for heating thereby at least a portion of the tube wall to prevent the tube from becoming clogged with ice. The heating arrangement includes a radiation absorbing surface configured for absorbing electromagnetic radiation (EMR) and generating the heat. At least one radiation conveying portion is provided for receiving EMR from an EMR source and conveying it to the radiation absorbing surface.

As used hereinafter, the term 'transparent' includes any material which is transparent, partially transparent, translucent, and material which is transparent to a certain spectrum of electromagnetic radiation, or transparent to a certain light spectrum.

The radiation absorbing surface can be a coating.

The coating can be disposed over a surface of the pitot tube, or over a surface of the radiation conveying portion. The coating can be paint and/or can be made of a light sensitive material.

The radiation absorbing surface can be integrated within the radiation conveying portion.

The electromagnetic radiation can be light radiation and the light radiation can be in the IR spectrum.

According to an example the tube wall can have an outer surface and an inner surface and the radiation conveying portion can be disposed therebetween. The outer surface can be the outer surface of the radiation conveying portion and the inner surface can be the inner surface of the radiation conveying portion. According to an example, the outer portion can constitute the radiation conveying portion. The outer portion can be a wall configured for conveying the EMR and the radiation absorbing surface can be disposed on the inner surface. Alternatively, the radiation absorbing surface can be integrated within the wall.

The radiation conveying portion can be at least partially made of a transparent material.

According to an example of the presently discloses subject matter the radiation conveying portion can be a shell mounted over the tube wall. The tube wall can include and outer portion and an inner portion and the shell can be configured to cover the outer portion. The radiation absorbing surface can be disposed on an inner surface of the shell. Alternatively, the radiation absorbing surface can be disposed adjacent the outer surface of the outer portion.

The radiation absorbing surface can be integrated within the shell.

The radiation conveying portion can be a pipe segment mounted inside the tube wall. The tube wall includes and outer portion and an inner portion and wherein the pipe segment can be configured to cover the inner portion. The radiation absorbing surface can be disposed on an inner surface of the pipe segment or the radiation absorbing surface can be integrated within the pipe segment. Alternatively, the radiation absorbing surface can be disposed on an outer surface of the pipe segment. The radiation absorbing surface can be disposed adjacent the inner surface of the outer portion.

The radiation conveying portion can be at least one pipe ring disposed on a portion of the inside surface of the tube wall.

The EMR source can be configured to emit the EMR in more than one frequency and can be configured to emit the EMR in various duty cycle modes selected in accordance with the ambient conditions.

According to another aspect of the presently disclosed subject matter there is provided a method for heating a pitot tube having a tube wall, the method comprising coupling to the tube wall a radiation absorbing surface configured for absorbing electromagnetic radiation and heating thereby the tube wall; providing an electromagnetic radiation source; and coupling a radiation conveying portion to the electromagnetic radiation source for receiving electromagnetic radiation therefrom and conveying it to the radiation absorbing surface.

According to a further aspect of the presently disclosed subject matter there is provided a heating arrangement for heating a pitot tube having a tube wall, the heating arrangement comprising; a radiation absorbing surface configured for absorbing electromagnetic radiation (EMR) and generating thereby heat, the radiation absorbing surface being configured for coupling thereof to the tube wall; an electromagnetic radiation source configured for emitting the EMR; and a radiation conveying portion coupled to the EMR for receiving electromagnetic radiation therefrom and conveying thereof to the radiation absorbing surface.

The radiation conveying portion can be a shell configured to be mounted over the tube wall or the radiation conveying portion can be a pipe segment configured to be mounted inside the tube wall.

The EMR source can be configured to emit the EMR in more than one frequency and can be configured to emit the EMR in various duty cycle modes selected in accordance with the ambient conditions.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
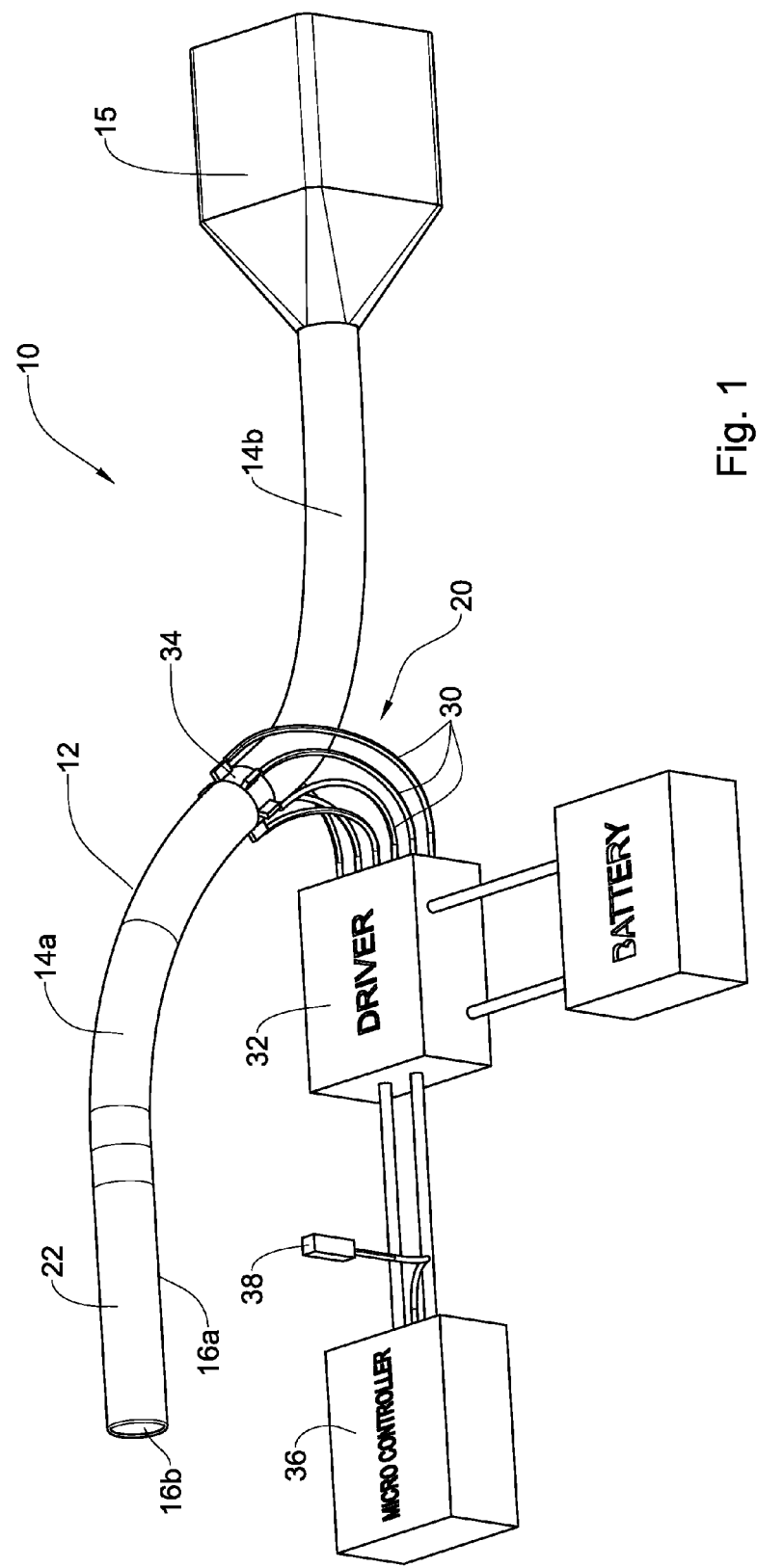
FIG. 1 is an isometric view of a pitot tube according to an example of the presently discloses subject matter.

FIG. 1 shows a pitot tube 10 comprising a tube wall 12 having an outer portion 14a configured to protrude outside a body of a vehicle (shown in FIG. 5), such an aircraft, and an inner portion 14b configured to be mounted inside the body of the vehicle. The tube 10 further includes a measuring box 15 fitted at the end of the inner portion 14b and configured with one or more measuring instruments for measuring pressure, fluid flow velocity, slide slip angle etc. The outer portion 14a can be mounted on the vehicle such that air flow in the direction opposite to the direction of displacement of the vehicle can enter the inside of the tube 10 towards the measuring box 15, where various parameters thereof can be detected and measured. Alternatively, the tube can be mounted in an angle with respect to the direction of the movement of the vehicle, for example and aircraft, such that the slide slip angle of the aircraft can be measured.

The pilot tube 10 further includes a heating arrangement 20 for generating heat for heating thereby at least a portion of the tube wall 12, for example the outer portion 14a so as to prevent the tube from becoming clogged with ice. The heating arrangement 20 comprising a radiation source, such as an electromagnetic radiation source (EMR) configured to emit radiation. The radiation can be light which is configured to generate heat, such as light in the IR spectrum. The light is emitted into a radiation conveying portion which can be mounted over the portion of the tube wall 12 to be heated. The conveying portion is configured to transmit the light to a radiation absorbing surface which absorbs the electromagnetic radiation (EMR) and generates heat thereby.

Figure 2:
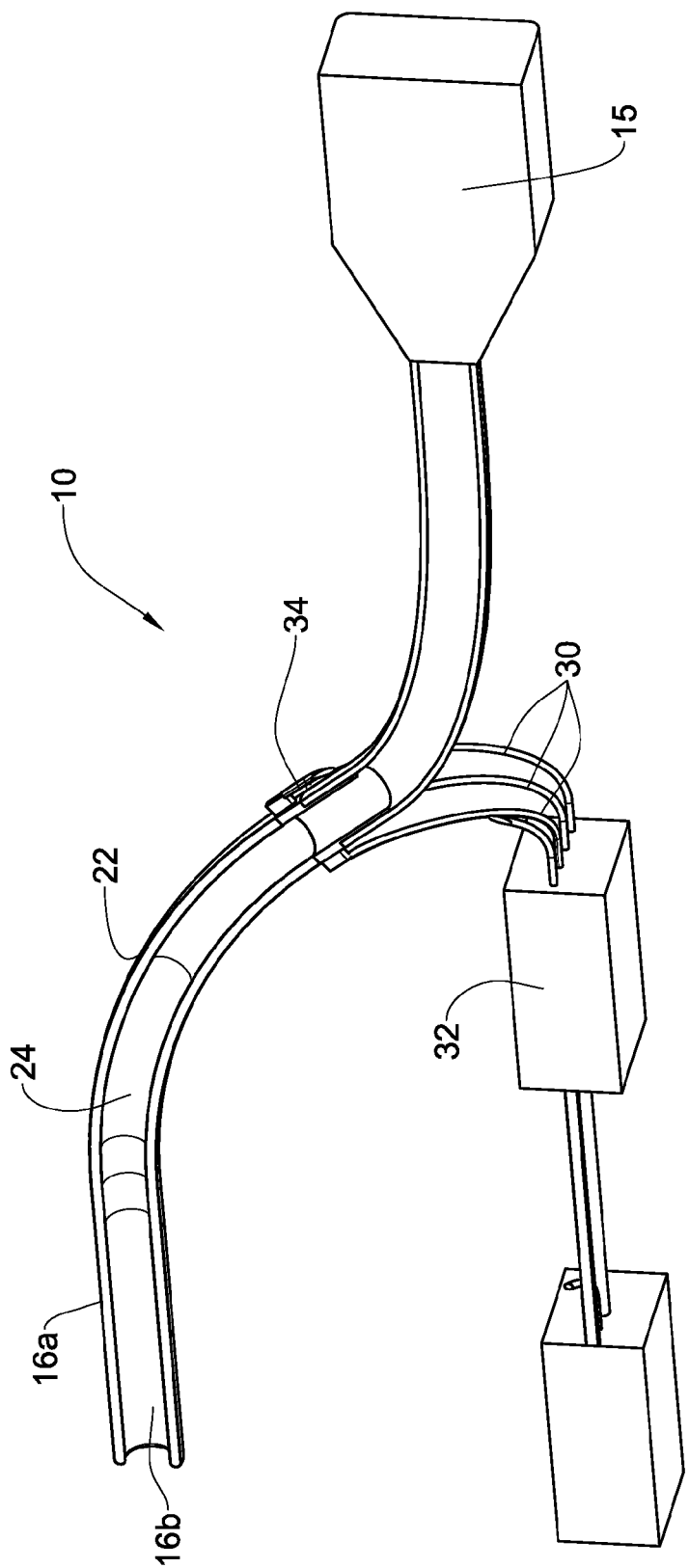
FIG. 2 is a side sectional view of the pitot tube of FIG. 1.
Figure 3:
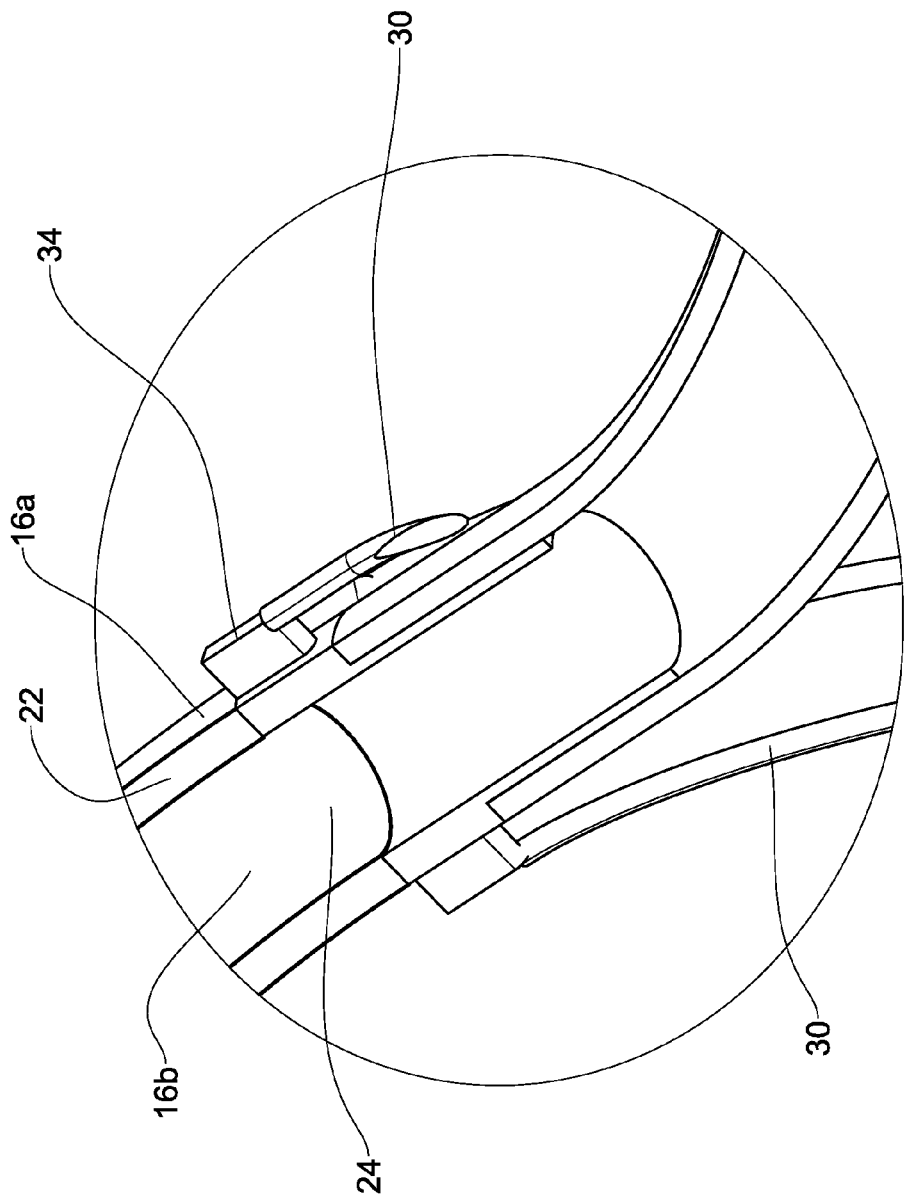
FIG. 3 is an enlarged view of a coupler according to an example of the presently discloses subject matter, for mounting on the pitot tube.

As shown in FIG. 2, the outer portion 14a of the tube wall 12 defines an outer surface 16a and an inner surface 16b, such that the radiation conveying portion is disposed therebetween. According to the illustrated example the conveying portion constitutes the entire outer portion 14a, and includes a transparent or translucent wall 22, such that light can be transmitted therethrough. The transparent wall 22 according to this example includes a radiation absorbing surface 24 defined on the inner surface 16b thereof such that light rays impinging thereon are absorbed by the radiation absorbing surface, and heat is generated thereby. The radiation absorbing surface 24 can be a coating disposed on at least a portion of the inner surface 16b, such which is sensitive to the light radiated through the transparent wall 22. Heating of the inner surface 16b of the outer portion 14a precludes ice accumulation thereon and prevents clogging of the tube 10. The coating can be made of an electromagnetic radiation sensitive material, or a color configured to absorb a certain light radiation spectrum.

A light source 35 can be coupled to the radiation conveying portion, i.e. to the transparent wall 22, so as to allow light to be transmitted therethrough toward the absorbing surface 24. It is appreciated that the light source can be configured to emit light directly on the absorbing surface 24, however in order to allow mounting the light source further from the absorbing surface, a conveying portion (such as the transparent wall 22 of the present example) can be provided.

According to an example, the light transmitted through the transparent wall 22 is configured to travel therethrough by total internal reflection, such that at least some of the light is reflected by the outer surface 16a back inside the transparent wall and towards the absorbing surface 24 defined on the inner surface 16b. It is noted that while the absorbing surface 24 is configured to absorbed at least a portion of the light impinging thereon, other portions of the light can be configured to be reflected back to the inside of the transparent wall 22 and towards the outer surface 16a, where the light is reflected back to other locations of the absorbing surface along the tube 10. This way, a single light source can be utilized for emitting light to be absorbed by multi locations on the absorbing surface defined along the inner surface of the tube.

According to an example the absorbing surface 24 can be defined along the entire inner surface 16b of the outer portion 14a of the tube 10, covering substantially the entire inner circumference thereof, thus providing heat to the entire inner surface of the outer potion 14a. However, according to other examples the absorbing surface 24 can be in the form of a plurality of surfaces defined along portions of the outer or inner portions of the tube 10 for example as strips along the inner surface 16b, or as a plurality of rings defined about the inner circumference of the tube 10. The locations of the absorbing surfaces can be determined such that the entire inner surface 16b is heated to the extent which precludes accumulation of ice therein.

According to a further example the absorbing surface 24 can be defined inside the transparent wall 22, integrated therein between the inner surface 16b and the outer surface 16a. Accordingly light impinging on the absorbing surface 24 generate heat which is conducted to the inner surface 16b thereby preventing ice accumulation thereon.

According to an example coupling the light source to the transparent wall 22 can be carried out by utilizing one or more optical fibers 30 for transmission of the light into the wall. The optical fibers 30 can be coupled on one end thereof to the light source, such as a laser diode integrated in a driver box 32, and on the other end thereof to a coupler 34. The coupler 34 can be a ring coupler disposed between the inner portion 14b and the outer portion 14a of the tube 10, however at a location such that it is disposed inside the body of the aircraft when the tube is mounted thereon. This way, the coupler 34 and the optical fibers 30 are not exposed to the winds and rain outside the aircraft.

The coupler 34 is configured to receive light rays from each of the optical fibers and to direct these rays forward into the transparent wall 22. As explained hereinabove the rays can be directed such that total internal reflection occurs inside the transparent wall 22 and the rays are directed towards the absorbing surface 24. The driver box 32 can be configured to provide radiation at various frequencies or various pulse patterns thus allowing selecting the appropriate duty cycle. The driver box 32 is controlled by a controller 36 which can be configured to receive data regarding various parameters outside the vehicle, such as temperature, barometric pressure, humidity, etc. The data can be received from one or more sensors 38 mounted in an aperture on the body of the vehicle (best seen in FIG. 4), such that it is exposed to the ambient outside the vehicle.

Alternatively, the sensor can be mounted inside the measuring box 15, or inside the tube 10. For example, the transparent wall 22 can be provided with a thermometer integrated therein, such that when the temperature of the transparent wall drops below a predetermined threshold, the controller 36 can operate the driver box 32 to provide radiation into the transparent wall. It is appreciated that the controller 36 and the driver box 32 can be integrated into a single module. In addition, according to another example, the radiation source can be integrated inside the coupler 34 such that it can illuminate directly into the transparent wall 22. The driver box 32 according to this example can be coupled to the coupler 34 by electric wires providing signals from an electronic system inside the driver box 32 for determining the duty cycle and period of the radiation source.

Figure 4:
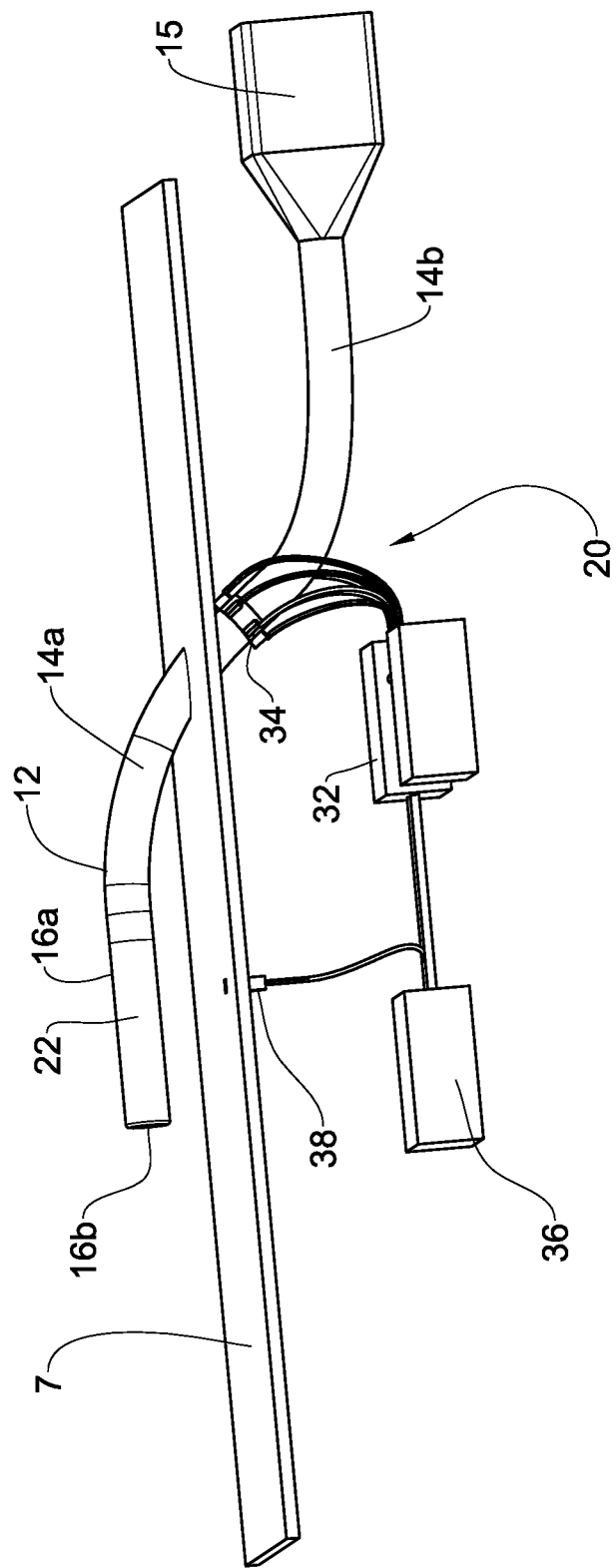
FIG. 4 is an isometric view of the pitot tube of FIG. 1 mounted in a wall segment of a vehicle.
Figure 5:
FIG. 5 is an isometric view of an aircraft having the pitot tube of FIG. 1 mounted therein.

As shown in FIGS. 4 and 5 when the tube 10 is mounted inside a body of a vehicle 5 the wall 7 of the body extends between the outer portion 14a and the inner portion 14b such that the inner portion of the tube, the coupler 34, the driver box 32, and the optical fibers 30 are disposed inside the body of the vehicle, while the outer portion is disposed outside thereof. This way, the tube is disposed such that air flow can enter the inside of the tube through the outer portion 14a and the inner portion 14b towards the measuring box 15. The temperature of the inside surface 16b of the tube 10, is maintained at a predetermined temperature thus preventing from humidity and ice in the airflow to accumulate on the inner surface 16b. The temperature is maintained by the heat generated by the absorbing surface 24 which receives EM radiation through the transparent wall 22.

It is appreciated that the intensity or the frequency of the EM radiation directed towards the absorbing surface 24 can be selected in accordance with the required temperature. Thus, the EMR source can be set to constantly emit radiation, or to emit radiation when the temperature of the inner surface 16b drops below a preset threshold.

Checking the temperature of the inner surface 16b can be carried out by detecting the temperature of the airflow, or for example by means of the sensor 38.

Figure 6:
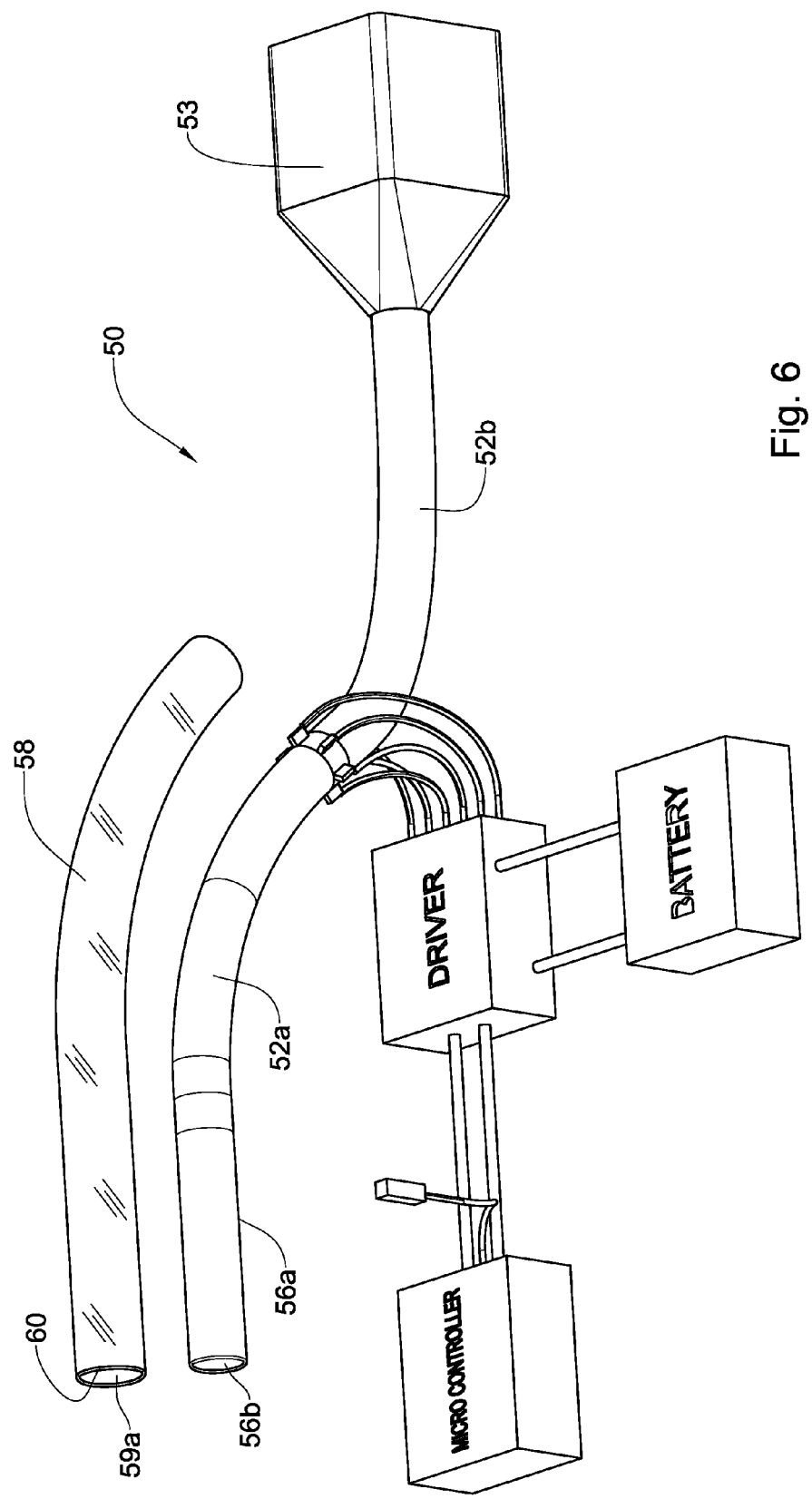
FIG. 6 is an exploded view of a pitot tube according to another example of the presently discloses subject matter.
Figure 7:
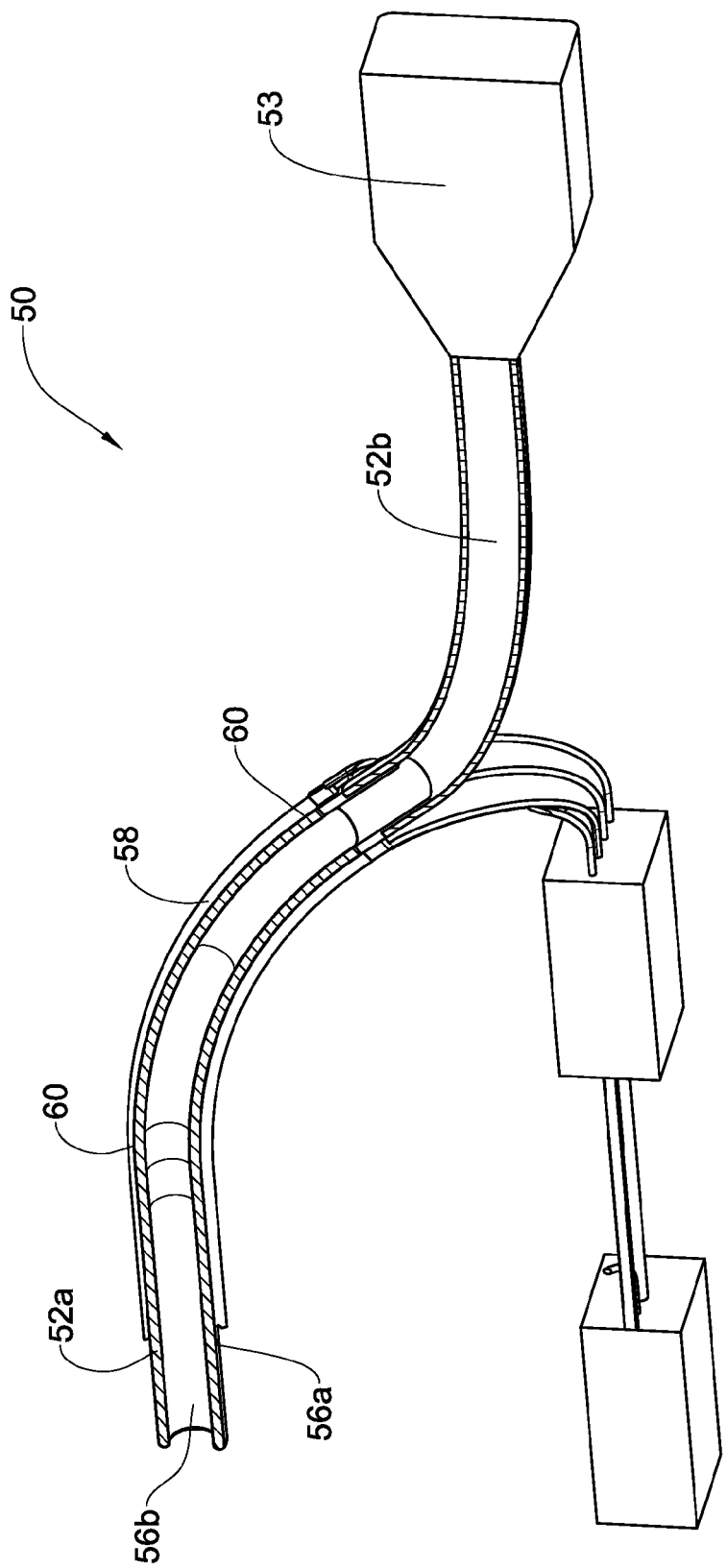
FIG. 7 is a side sectional view of the pitot tube of FIG. 6.

Reference is now made to FIGS. 6 and 7, showing a pitot tube 50 according to another example of the presently disclosed subject matter. The tube 50 is substantially the same as the tube 10 of FIGS. 1 to 4 and includes an outer portion 52a for mounting outside the body of the vehicle, and an inner portion 52b for mounting inside the body of the vehicle. The tube 50 further includes a measuring box 53 mounted at the end of the inner portion 52b and a heating arrangement in the form of a radiation source for emitting electromagnetic radiation for heating the tube. According to this example both the outer portion 52a and the inner portion 52b of the tube can be made of any suitable material such as metal. The outer portion 52a however is configured with an EMR conveying portion such as a transparent shell 58, covering portions of the outer potion 52a. The transparent shell 58 can be configured to cover the entire or portions of the outer surface 56a of the outer portion 52a, such a sleeve mounted on the outer portion. According to another example, the transparent shell 58 can be configured to cover the entire or portions of the inner surface 56b of the outer portion 52a, such a sleeve mounted inside the outer portion.

According to the illustrated example, the transparent shell 58 includes an absorbing surface 60 defined therein for example on the inside surface 59a thereof, such that when the shell is disposed over the outer portion 52a the absorbing surface 60 is disposed adjacent the outer surface 56a of the outer portion. This way, the absorbing surface 60 receives radiation transmitted through the transparent shell 58 and generates heat thereby for heating the outer portion 52a of the tube 50. It is appreciated that the absorbing surface can be defined inside the transparent shell 58, and be configured to generates heat thereby heating the transparent shell and providing heat by conduction to the outer portion 52a. Alternatively, the absorbing surface 60 can be defined on the outer surface 56a of the outer portion 52a, and be configured to receive radiation transmitted through the transparent shell 58 and to generate heat thereby for heating the outer portion 52a. It is appreciated that according this example the transparent shell 58 need not be affixed to the outer portion 52a, rather the transparent shell can be disposed over the outer portion with gap therebetween having air, vacuum, or fluids. The transparent shell 58 can be configured to emit the light transmitted therethrough towards the absorbing surface 60 through the gap therebetween.

It is further appreciated that the transparent shell 58 need not be disposed over the entire outer portion 52a, rather it can be a radiation conveying element disposed over portions of the outer portion, for example over areas where ice is likely to accumulate, such as areas with curves, ridges or grooves. In addition, the radiation conveying portion can be configured to scatter the radiation transmitted therethrough in the direction towards the absorbing surface 60. Accordingly, the radiation conveying portion can be a relatively thin element, however configured to scatter the radiation over a relatively large area of the absorbing surface. Such arrangement can be achieved by utilizing various optical instruments, as known.

According to a further example (not shown) the radiation conveying portion can be a transparent pipe section having a radius smaller than the inner radius of the outer portion 52a such that it can be mounted inside the outer portion 52a. The transparent pipe section is configured to allow incoming airflow towards to inner portion 52b and the measuring box. The absorbing surface 60, according to this example, can be disposed on the inner surface of the transparent pipe section, such that radiation through the transparent pipe section impinges thereon and heat is generated thereby of precluding accumulation of ice on the inner surface of the pipe section.

Alternatively, the absorbing surface can be disposed inside the transparent pipe section such that when radiation impinges thereon heat is generated heating thereby the entire pipe section.

As in the previous examples, the transparent pipe can be disposed inside the outer portion, such that the entire inner surface thereof is covered. However, according to other examples, the transparent pipe can be disposed only over certain areas of the inside surface of the outer portion, for example areas in which ice is likely to accumulate. The transparent pipe thus can be in the form of a transparent ring, or other transparent element configured to be mounted on area of the inner surface of the outer portion of the tube.

Although the transparent pipe according to this example does not cover the entire inner surface of the outer portion, the absorbing surface can be configured to generate enough heat to maintain the temperature of the entire inner surface. It is appreciated that according to this example the radiation, such as the light can be transmitted from the light source to the transparent ring by means of optical fibers extending from the light source through the outer portion of the tube and towards the transparent ring the transparent element or any other radiation conveying portion.

Those skilled in the art to which the presently disclosed subject matter pertains will readily appreciate that numerous changes, variations, and modifications can be made without departing from the scope of the invention, mutatis mutandis.

The invention claimed is:

1. A pitot tube, comprising:
    a tube wall; and
    a heating arrangement configured for generating heat for heating at least a portion of said tube wall to prevent said pivot tube from becoming clogged with ice, said heating arrangement including:
    a radiation absorbing surface configured for absorbing electromagnetic radiation (EMR) and generating said heat; and
    at least one radiation conveying portion for receiving EMR from an EMR source and conveying said EMR to said radiation absorbing surface.

2. The pitot tube according to claim 1 wherein said radiation absorbing surface includes a coating made of a light sensitive material, and wherein said EMR includes light radiation.

3. The pitot tube according to claim 1 wherein said tube wall includes an outer surface and an inner surface, and wherein said radiation conveying portion is disposed between said outer surface and said inner surface.

4. The pitot tube according to claim 3 wherein said outer surface is said outer surface of said radiation conveying portion and said inner surface is said inner surface of said radiation conveying portion.

5. The pitot tube according to claim 4 wherein said outer surface is a wall configured for conveying said EMR, and wherein said radiation absorbing surface is disposed on said inner surface.

6. The pitot tube according to claim 5 wherein said radiation absorbing surface is integrated within said wall.

7. The pitot tube of claim 1 wherein said radiation conveying portion is at least partially made of a transparent material.

8. The pitot tube according to claim 1 wherein said radiation conveying portion includes a shell mounted over said tube wall.

9. The pitot tube according to claim 8 wherein said tube wall includes an outer portion and an inner portion, and wherein said shell is configured to cover said outer portion.

10. The pitot tube according to claim 9 wherein said radiation absorbing surface is disposed on an inner surface of said shell.

11. The pitot tube according to claim 10 wherein said radiation absorbing surface is disposed adjacent to an outer surface of said outer portion.

12. The pitot tube according to claim 9 wherein said radiation absorbing surface is integrated within said shell.

13. The pitot tube according to claim 1 wherein said radiation conveying portion includes a pipe segment mounted inside of said tube wall.

14. The pitot tube according to claim 13 wherein said tube wall includes an outer portion and an inner portion, and wherein said pipe segment is configured to cover said inner portion.

15. The pitot tube according to claim 13 wherein said radiation absorbing surface is disposed on an inner surface of said pipe segment.

16. The pitot tube according to claim 13 wherein said radiation absorbing surface is integrated within said pipe segment.

17. The pitot tube according to claim 13 wherein said radiation absorbing surface is disposed on an outer surface of said pipe segment.

18. The pitot tube according to claim 17 wherein said radiation absorbing surface is disposed adjacent to an inner surface of said outer portion.

19. A heating arrangement for heating a pitot tube having a tube wall, said heating arrangement comprising:
    a radiation absorbing surface configured for absorbing electromagnetic radiation (EMR) and generating thereby heat, said radiation absorbing surface being configured for coupling thereof to said tube wall;
    an electromagnetic radiation source configured for emitting said EMR; and
    a radiation conveying portion configured to be coupled to said EMR for receiving said EMR therefrom and conveying said EMR to said radiation absorbing surface.

20. The heating arrangement according to claim 19 wherein said electromagnetic radiation source is configured to emit said EMR in more than one frequency, and wherein said electromagnetic radiation source is configured to emit said EMR in various duty cycle modes selected in accordance with ambient conditions.

* * * * *